US 6,705,661 B2

(12) United States Patent
Amirmoini

(10) Patent No.: US 6,705,661 B2
(45) Date of Patent: Mar. 16, 2004

(54) UNITARY VISOR ATTACHMENT

(76) Inventor: G. Hossein Amirmoini, 11520 San Vicente Blvd., Suite 102, Los Angeles, CA (US) 90049

( * ) Notice: Subject to any disclaimer, the term of this patent is extended or adjusted under 35 U.S.C. 154(b) by 0 days.

(21) Appl. No.: 10/219,154

(22) Filed: Aug. 14, 2002

(65) Prior Publication Data
US 2004/0032143 A1 Feb. 19, 2004

(51) Int. Cl.$^7$ ................................................. B60J 3/00
(52) U.S. Cl. ..................................... 296/97.6; 296/97.1
(58) Field of Search ............................. 296/97.6, 97.8, 296/97.1

(56) References Cited

U.S. PATENT DOCUMENTS

| 2,238,981 | A | * | 4/1941 | Office | 296/97.8 |
|---|---|---|---|---|---|
| 2,432,674 | A | * | 12/1947 | Fry | 296/97.5 |
| 2,839,860 | A | * | 6/1958 | Pollack | 296/97.5 |
| 2,842,395 | A | | 7/1958 | Davis | |
| 3,480,322 | A | * | 11/1969 | Newell | 296/97.8 |
| 4,824,161 | A | * | 4/1989 | Lee | 296/97.8 |
| 5,112,096 | A | * | 5/1992 | Keenan | 296/97.6 |
| 5,165,748 | A | * | 11/1992 | O'Connor | 296/97.6 |
| 5,427,427 | A | | 6/1995 | Holter | |
| 5,651,577 | A | | 7/1997 | Lacy et al. | |
| 5,882,059 | A | * | 3/1999 | Romero | 296/97.6 |
| 6,176,539 | B1 | * | 1/2001 | Westerman | 296/97.6 |
| 6,264,265 | B1 | * | 7/2001 | Hestehave et al. | 296/97.6 |

* cited by examiner

Primary Examiner—D. Glenn Dayoan
Assistant Examiner—Lori L Coletta
(74) Attorney, Agent, or Firm—James E. Brunton

(57) ABSTRACT

A sun visor attachment which is constructed from generally planer, unitary plastic member that can be folded into the configuration of a sleeve which is adapted to slidably extend over the sun visor of a vehicle. When in position over the vehicle sun visor, the attachment can be slidably adjusted transversely, of the vehicle, to block sun rays entering the windshield of the vehicle at an angle between the driver side and passenger side sun visors. In one form of the invention, the attachment also includes a lower panel that can be folded from a stowed position into a downwardly extending position to effectively block sun rays entering below the vehicle visor and a generally fan shaped, side panel that is foldable out of plane to block sun rays entering through the driver side window.

16 Claims, 4 Drawing Sheets

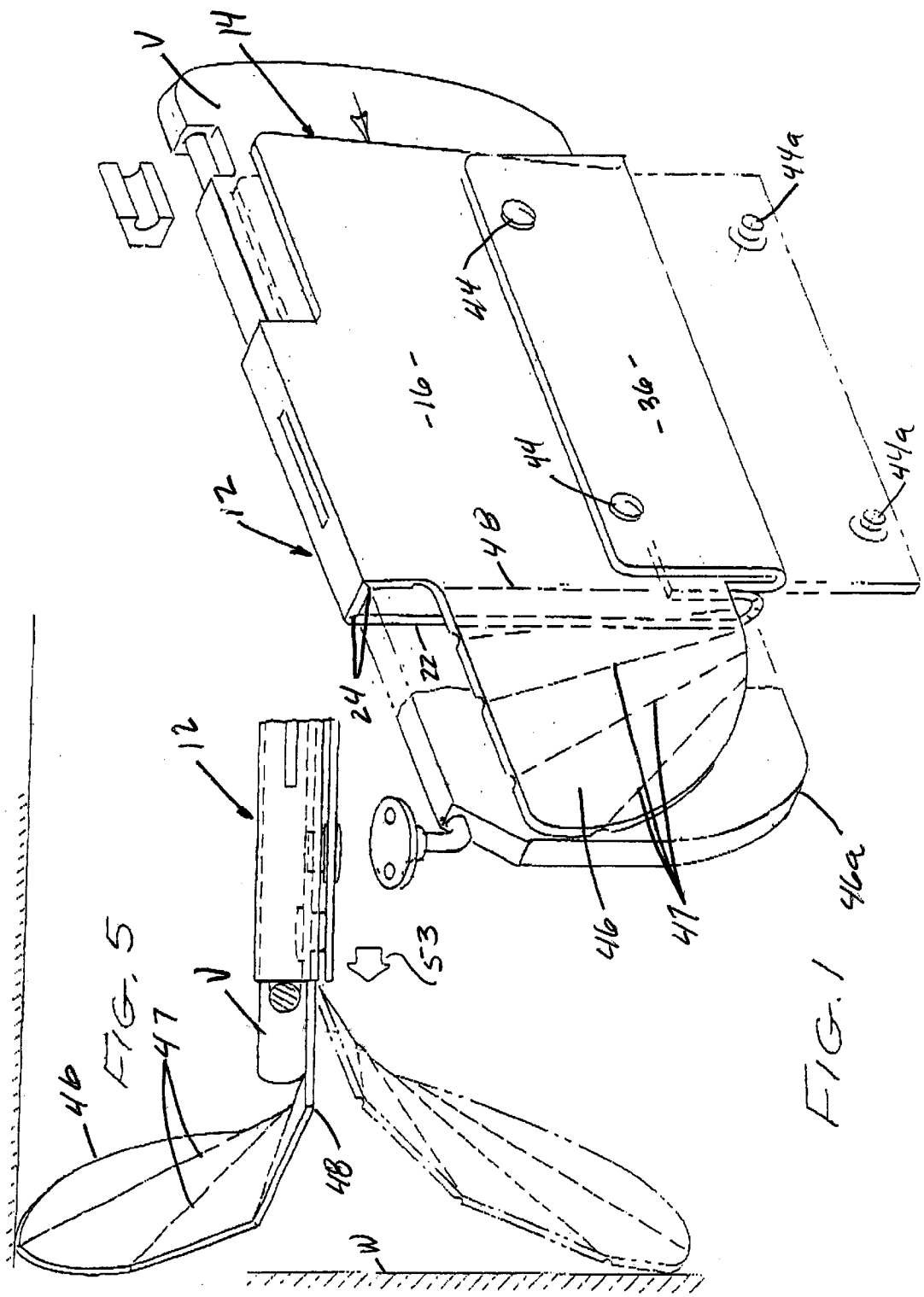

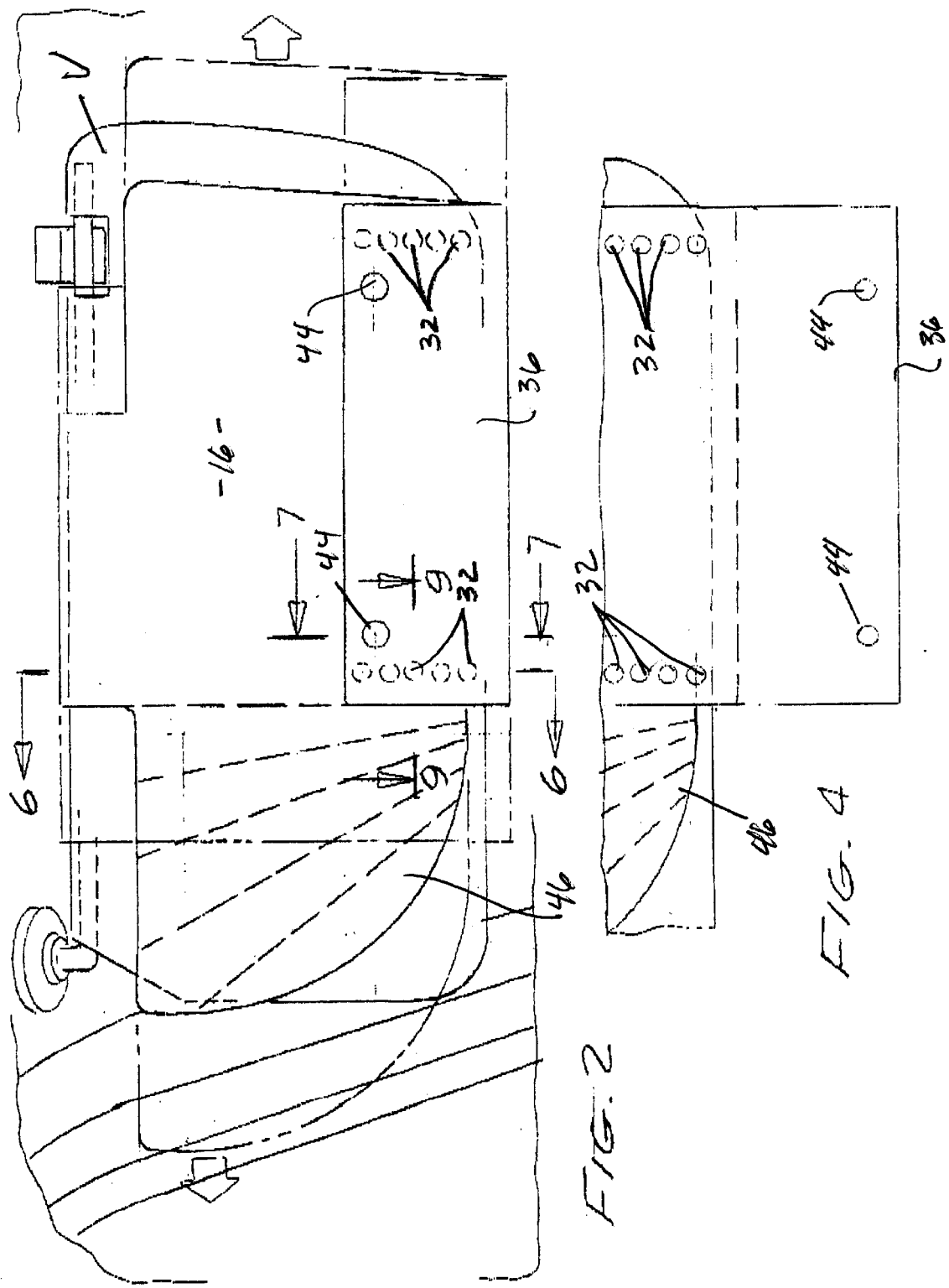

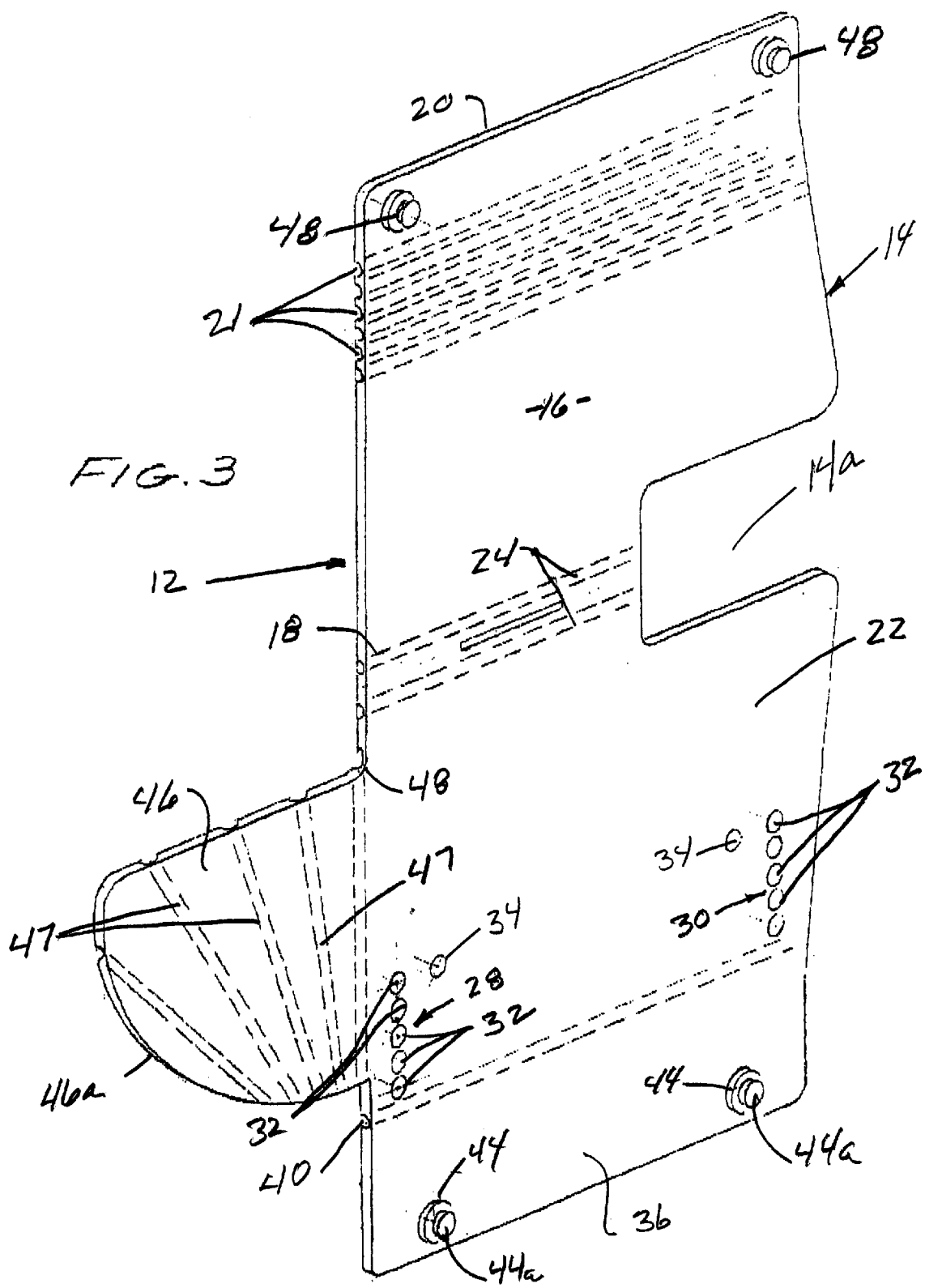

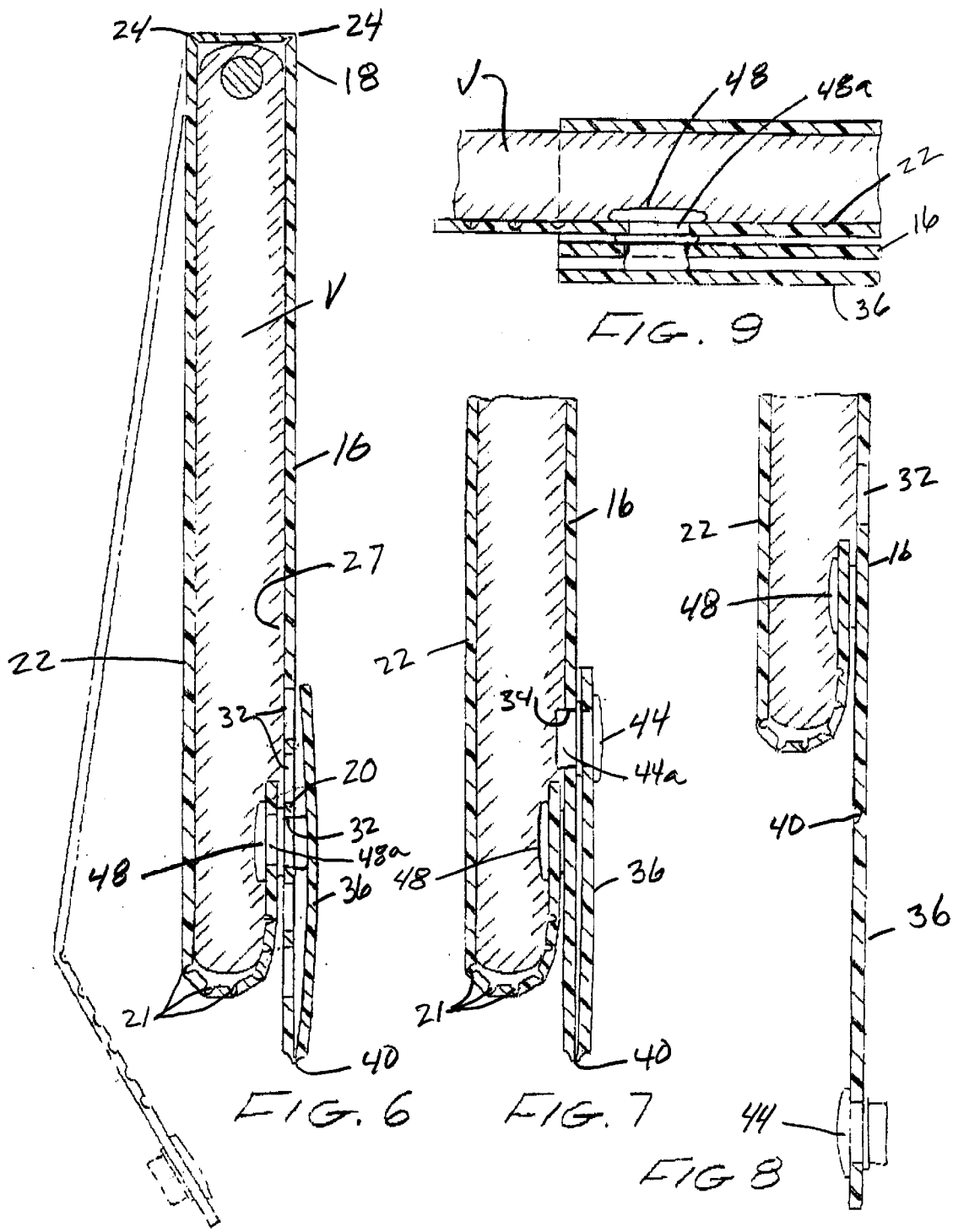

UNITARY VISOR ATTACHMENT

BACKGROUND OF THE INVENTION

1. Field of the Invention

The present invention relates generally to attachments for sun visors for automobile, trucks and other motor vehicles. More particularly, the invention concerns an adjustable sun visor attachment that is formed from a generally planar unitary member, which in its folded condition comprises a sleeve, which is slidably extendable over the sun visor. The sun visor attachment includes a glare shield that can be pivoted downwardly to increase the effective height of the sun visor. In one form of the invention, the sun visor attachment also includes a side panel that is bendable out of plane.

2. Discussion of the Invention

Many modern vehicles have large windshields that provide good visibility, but at the same time increase the exposure of the persons riding in the front seats to the sun's rays. The sun visors typically installed in these vehicles generally are not large enough to provide adequate protection from the sun's rays, particularly when the sun is near the horizon and when the vehicle is traveling at an angle to the direction of the sun's rays. Under such conditions, the sun's rays projecting through the side windows and the windshield will impinge directly on the face of persons riding in the front seats often causing considerable discomfort and vision impairment. More particularly, the standard vehicle visor will usually not extend into the center region of the windshield due to the interfering presence of the rear view mirror and usually does not extend downwardly far enough to cut off the sun's rays when the sun is low in the sky.

To overcome the foregoing deficiencies, a number of sun visor attachments of different designs have been devised. Typically, these sun visor attachments can be permanently or removably secured to the vehicle sun visor to intercept light rays, which interfere with the driver's vision. For example, U.S. Pat. No. 6,176,539 issued to Westerman, discloses a sun visor extension comprising a body having a generally rectangular shape and two wings foldably connected to and extending along opposing long sides of the body. The width of the wings is less than that of the body. In addition, the wings are adapted to be folded towards each other to a juxtaposed position abutting the body thereby creating an open-ended cavity having the length and width of body. An extension is slidably received within the cavity. The extension is a rectangular shape whose length corresponds to that of the body and whose width is narrower than that of the body. The extension is frictionally retained within the cavity by the wings and the body. The sun visor extension is removably attached to a sun visor.

U.S. Pat. No. 5,427,427 issued to Holter discloses an auxiliary visor, which can be interconnected with a motor vehicle sun visor. The Holter patent describes an auxiliary sun or glare shield in the form of a tinted transparent sheet along with an arrangement for demountably attaching the sheet to and positioning the sheet with respect to a vehicle visor. A bracket having an inverted J shape is slid over the pivot edge of a vehicle visor and is held in position by an adjustable strap. A pair of parallel arms are pivotally mounted to the bracket and support the sheet at their lower ends by compound hinge assemblies which permit the sheet to be rotated about a horizontal axis parallel to its top edge and/or to be swung by movement of the arms to achieve the desired position. The sheet folds parallel to the vehicle visor for storage.

U.S. Pat. No. 5,651,577 issued to Lacy et al. discloses a visor extension that is removably mountable on a vehicle visor to extend the shading or screening capability of the vehicle visor. The visor extension has a front panel and a rear panel joined together at their upper edges by a center strip that is shorter than the panels. The strip and the panels in combination form slots at each end of the center strip. Releasable mateable fasteners are provided on the lower edges of each panel to secure the visor extension on the vehicle visor. The visor extension is movable on the vehicle visor to enhance the shading capability. The formed slots permit the visor extension to be moved beyond an end attachment that attaches the visor to the vehicle.

U.S. Pat. No. 2,842,395 issued to Davis concerns a sun visor extension having a pair of side members spaced apart for engaging each side of the vehicle sun visor. A "U"-shaped member joins the bottom edges of the side members together using rivets and an elongated member joins the top edges of the side members together also using rivets. The elongate member has top edges and opposing sidewalls engaging the inner surfaces of the side members. The elongate member also extends upwardly and outwardly at an angle and thence inwardly to a point centrally of the side members forming a substantially diamond shape gripping member. The sides define a space narrower than the body of the sun visor so that when the side members are inserted over the body of the sun visor the outward tension on the side members will cause the depending sidewalls of the elongate member to exert tension on the upper edge of the body of the sun visor. An extension member of substantially nonflexible material is hingedly connected to one leg of the U-shaped member by a conventional hinge so that it can be pivoted into a downwardly extending position.

Unlike the prior art devices, the sun visor attachment of the present invention is a uniquely constructed from a generally planar unitary member that can be folded into the configuration of a sleeve which is adapted to slidably extend over the sun visor. With this novel construction the attachment can be slidably adjusted transversely, of the vehicle to block sun rays entering the windshield of the vehicle at an angle between the driver side and passenger side sun visors. In one form of the invention, the attachment also includes a lower panel that can be folded from a stowed position into a downwardly extending position to effectively block sun rays entering below the vehicle visor and a generally fan shaped, side panel that is foldable out of plane to block sun rays entering through the driver side window.

SUMMARY OF THE INVENTION

It is an object of the present invention to provide a sun visor attachment for a vehicle which can be quickly deployed to provide glare protection for the vehicle occupant in those areas not covered by the vehicle visor, including the areas below, at the sides of and adjacent to the corners of the vehicle visor.

Another object of the invention to provide a sun visor attachment of the aforementioned character which can be quickly attached to or removed from a vehicle visor and which will not in any way interfere with the normal function of the vehicle visor.

Another object of the invention is to provide a sun visor attachment as described which can readily be transferred from one vehicle to another and which may be used on vehicle sun visors of different widths.

Another object of the invention is to provide a sun visor attachment as described in the preceding paragraphs, which can be quickly, positioned with one hand and which will remain in the selected position.

Another object of the present invention to provide a sun visor attachment for use in motor vehicles which can be folded from a unitary planar configuration into a sleeve like configuration so that the attachment can be easily, slidably affixed to a vehicle sun visor. When in position over the sun visor the attachment can quickly be adjusted to block light rays entering the vehicle windshield proximate the upper and lower central portions thereof as well as light rays entering the vehicle through the driver's side window.

Another object of the invention is to provide a sun visor attachment of the aforementioned character in which the unitary planer member can be selectively folded into sleeve like configurations of various sizes so that the attachment can readily be used with vehicle visors of various widths.

Another object of the invention is to provide a sun visor attachment as described in the preceding paragraphs which further includes a lower panel that can be folded from a stowed position proximate the sleeve like configuration into an downwardly extended position to block light rays entering the vehicle below the vehicle visor.

Still another object of the invention is to provide a sun visor attachment as described in the preceding paragraphs which is of simple construction, has a minimum number of parts, is easy to use and is inexpensive to manufacture.

These and other objects of the invention will be realized by the sun visor attachment of the present invention, the details of which are described in greater detail in the paragraphs, which follow.

By way of summary, the sun visor attachment of the present invention comprises a generally planar, unitary member having a first portion having first and second margins; a second portion hingedly connected to the first portion by a living hinge for movement between a first position and a second position wherein the second portion overlays the first portion and is spaced apart there from to define there between a space for slidably receiving the vehicle sun visor; a third portion hingedly connected to the second portion by a living hinge for movement between a first position wherein the third portion is generally co-planar with the second portion to a second position wherein the third portion overlays at least part of the second portion, the third portion having first connectors for releasably interconnecting the third portion with the second portion when the third portion is in the second position; and a fourth portion connected to the second portion and extending there position; and a fourth portion connected to the second portion and extending there from.

BRIEF DESCRIPTION OF THE DRAWINGS

FIG. 1 is a generally perspective view of one form of the sun visor attachment of the invention shown interconnected with a vehicle sun visor.

FIG. 2 is a front view of the sun visor attachment shown in FIG. 1.

FIG. 3 is a generally perspective view of the sun visor attachment of the invention shown in an unfolded, generally planer configuration.

FIG. 4 is a fragmentary view generally similar to FIG. 2, but showing the lower or third panel of the sun visor attachment moved from the stowed position shown in FIG. 2 into a downwardly depending position.

FIG. 5 is an enlarged, fragmentary top view of the left-hand portion of the sun visor attachment shown in FIG. 1 after the attachment has been moved to the left or toward the driver side of the vehicle.

FIG. 6 is an enlarged, and cross-sectional view taken along lines 6—6 of FIG. 2.

FIG. 7 is an enlarged, cross-sectional view taken along lines 7—7 of FIG. 2.

FIG. 8 is an enlarged, cross-sectional view similar to FIG. 7, but showing the third panel of the sun visor attachment hingedly moved into a downwardly depending position.

FIG. 9 is an enlarged, cross-sectional view taken along lines 9—9 of FIG. 2.

DESCRIPTION OF THE INVENTION

Referring to the drawings and particularly to FIGS. 1 and 3, one form of the sun visor attachment of the present invention is there illustrated and generally identified by the numeral 12. In this embodiment of the invention, the attachment comprises a generally planar, unitary member 14 preferably constructed from a substantially rigid plastic material and having a first portion or panel 16 having first and second margins 18 and 20. Intermediate margins 18 and 20 is a series of fold lines 21 that enables first panel 16 to be folded into the configuration shown in FIG. 6.

A second portion or panel 22 is connected to first portion 16 proximate first margin 18 for movement about living hinges 24 between the first generally planer configuration shown in FIG. 3 and the second, folded position shown in FIG. 6 wherein the central body of second portion 22 overlays first portion 16 and is spaced apart there from to define there between a space 27 for slidably receiving the vehicle sun visor "V". As best seen in FIG. 3, a transverse opening 14a is formed in member 14 proximate the junction of portions 16 and 22. As also shown in FIG. 3, second portion 22 has first and second spaced apart sets of apertures 28 and 30. Each set of apertures 28 and 30 comprises a plurality of vertically spaced apart first apertures 32 the purpose of which will presently be discussed. Second portion 22 is also provided with a pair of spaced apart second apertures 34.

A third portion or panel 36 is connected to second portion 22 for movement about a living hinge 40 between a first position shown in FIG. 1, wherein the third portion 36 is generally co-planar with second portion 22 to a second position shown in FIG. 6 wherein the third portion overlays a part of second portion 22. As shown in FIG. 3, third portion 36 is provided with first connector means for releasably interconnecting the third portion with the second portion when the third portion is in the first position. The first connector means here comprises a pair of snaps 44 of conventional construction that include circular shaped protuberances 44a that are insertable into the pair of spaced apart second apertures 34 in the manner shown in FIG. 7.

As best seen in FIGS. 1 and 3, a fourth portion or panel 46 is connected to second panel 22 by a living hinge 48 and extends there from toward the driver side window "W" (FIG. 5). Fourth panel 46 has a curved margin 46a and is deformable from the position shown in FIG. 3 wherein it is substantially coplanar with second portion 22 into the position shown in FIG. 5 wherein it is folded out of plane about a series of living hinges 47. In the form of the invention shown in the drawings, the first, second, third and fourth portions of the visor attachment are integrally formed from a substantially rigid, yieldably deformable plastic material.

As. illustrated in FIG. 3, first portion 16 further includes second connector means for releasably connecting second margin 20 of the first portion to second portion 22. The second connector means is here provided in the form of a pair of conventional snaps 48 having generally circular protuberances 48a that are receivable and a selected pair of the apertures 32 of sets 28 and 30 (see FIGS. 6 and 9).

In using the apparatus of the present invention, the attachment is folded from the planar configuration shown in FIG. 3 into the folded configuration shown in FIG. 6 wherein portions 16 and 22 are spaced apart a distance sufficient to permit the attachment to be readily, slidably positioned over the vehicle sun visor. It is be noted that during the folding operation, snaps 48 can be inserted into selected pairs of apertures 32 to adjust and the overall depth of the space 27 so as to accommodate the width of the particular visor with which the attachment is to be used. As a part of the folding operation, third panel 36 can be folded about living hinge 40 and a moved into the position shown in FIG. 7 wherein snaps 44 are inserted into spaced apart apertures 34. When the attachment is in position over the vehicle visor, lower panel 36 can be moved as may be required into the distended position shown in FIG. 8 by removing snaps 44 from apertures 34 and folding the panel downwardly about living hinge 40. As illustrated in FIG. 2, the attachment can be moved transversally of the vehicle in the direction of the arrows of FIG. 2 so as to block the sun's rays entering the vehicle on either side of the vehicle sun visor. As depicted in FIG. 5, a sliding movement of the visor attachment in the direction of the arrow 53 will cause fourth panel 46 to move from the generally planar configuration shown in FIG. 1 into the curved configuration shown in FIG. 5 wherein the outer edge of the fourth panel engages the driver side window.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following documents.

I claim:

1. An attachment to a vehicle sun visor comprising a generally planar, unitary member having:
    (a) a first portion having first and second margins;
    (b) a second portion connected to said first portion proximate said first margin for movement about a living hinge between a first position and a second position wherein said second portion overlays said first portion and is spaced apart there from to define there between a space for slidably receiving the vehicle sun visor; and
    (c) a third portion connected to said second portion for movement about a living hinge between a first position wherein said third portion is generally co-planar with said second portion to a second position wherein said third portion overlays at least part of said second portion, said third portion having first connector means for releasably interconnecting said third portion with said second portion when said third portion is in said second position.

2. The attachment as defined in claim 1 further including a fourth portion connected to said second portion and extending therefrom.

3. The attachment as defined in claim 1 in which said second portion has a plurality of spaced apart first apertures and in which said first portion further includes second connector means for releasably connecting said second margin of said first portion to said second portion.

4. The attachment as defined in claim 3 in which said second connector means comprises at least one snap insertable into a selected one of said spaced apart first apertures.

5. The attachment as defined in claim 3 in which said second portion has a second aperture and in which said first connector means comprises a snap insertable into said second aperture.

6. An attachment to a vehicle sun visor comprising a generally planar, unitary member having:
    (a) a first portion having first and second margins;
    (b) a second portion connected to said first portion proximate said first margin for movement about a living hinge between a first position and a second position wherein said second portion overlays said first portion and is spaced apart there from to define there between a space for slidably receiving the vehicle sun visor said second portion having a plurality of spaced apart first apertures and a pair of spaced apart second apertures;
    (c) a third portion connected to said second portion for movement about a living hinge between a first position wherein said third portion is generally co-planar with said second portion to a second position wherein said third portion overlays at least part of said second portion, said third portion having first connector means for releasably interconnecting said third portion with said second portion when said third portion is in said second position, said first connector means comprises a pair of snaps insertable into said pair of spaced apart second apertures; and
    (d) a fourth portion connected to said second portion by a living hinge and extending there from, said fourth portion having a curved margin.

7. The attachment as defined in claim 6 in which said first portion further includes second connector means for releasably connecting said second margin of said first portion to said second portion.

8. The attachment as defined in claim 7 in which said second connector means comprises at least one snap insertable into a selected one of said spaced apart first apertures.

9. The attachment as defined in claim 8 in which said first, second, third and fourth portions are integrally formed from a plastic material.

10. The attachment as defined in claim 9 in which said fourth portion is deformable from a generally planer configuration into a curved, nonplanar configuration.

11. An attachment to a vehicle sun visor comprising:
    (a) a first panel;
    (b) a second panel connected to said first panel by a living hinge, said second panel overlaying said first panel and being spaced apart there from to define a space there between for slidably receiving the vehicle sun visor;
    (c) a third panel connected to said second panel by a living hinge for movement between a folded position and an unfolded position wherein said third panel depends downwardly from said first panel;
    (d) a fourth panel connected to said second panel by a living hinge and extending there from; and
    (e) first connector means carried by said third panel for connecting said third panel to said second panel when said third panel is in said folded position.

12. An attachment to a vehicle sun visor comprising:
    (a) a first panel including a second margin;
    (b) a second panel connected to said first panel by a living hinge, said second panel overlaying said first panel and being spaced apart there from to define a space there between for slidably receiving the vehicle sun visor said second panel having a plurality of spaced apart first apertures, said first panel further including second connector means for releasably connecting said second margin of said first panel to said second panel;

(c) a third panel connected to said second panel by a living hinge for movement between a folded position and an unfolded position wherein said third panel depends downwardly from said first panel; and (d) a fourth panel connected to said second panel by a living hinge and extending there from.

13. The attachment as defined in claim 12 in which said second connector means comprises at least one snap insertable into a selected one of said spaced apart first apertures.

14. The attachment as defined in claim 12 which said second panel has a second aperture and in which said first connector means comprises a snap insertable into said second aperture.

15. The attachment as defined in claim 12 in which said first, second, third and fourth panels are integrally formed from a plastic material.

16. The attachment as defined in claim 11 in which said fourth panel is generally fan shaped and is deformable from a generally planer configuration into a curved configuration.

* * * * *